J. Whitehead,
Harvester Rake.
No. 16156. Patented Dec. 2, 1856.
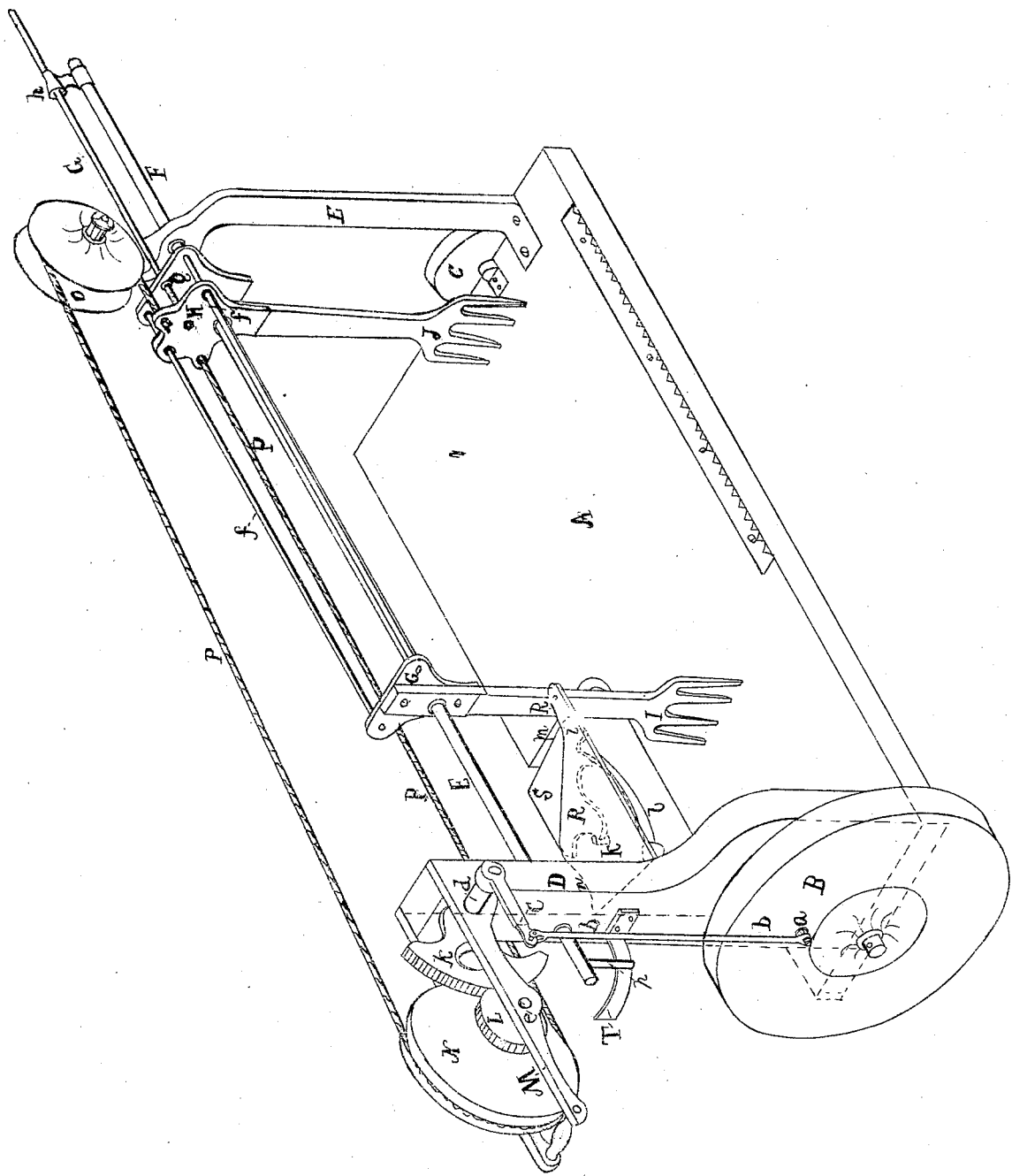

UNITED STATES PATENT OFFICE.

JESSE WHITEHEAD, OF MANCHESTER, VIRGINIA.

IMPROVEMENT IN SELF-ACTING RAKES FOR HARVESTING-MACHINES.

Specification forming part of Letters Patent No. 16,156, dated December 2, 1856.

*To all whom it may concern:*

Be it known that I, JESSE WHITEHEAD, of Manchester, in the county of Chesterfield and State of Virginia, have invented certain new and useful Improvements in Self-Acting Rakes for Harvesting-Machines; and I do hereby declare the following to be a full, clear, and exact description of the same, reference being had to the accompanying drawing, making a part thereof, and which represents in perspective the rake and so much of the machine to which it may be connected as will illustrate its operation.

The nature of my invention relates to an automatic raker composed of two traveling heads, carrying arms or fingers, which traverse together and independently of each other and adapt themselves to gavels of various sizes with equal efficacy, and operating as will be described.

To enable others skilled in the art to make and use my invention, I will proceed to describe the same with reference to the drawings.

A may represent the platform of a harvesting-machine, and B a driving or supporting wheel at one side thereof, the other side of the platform being supported by an outside wheel, C, in the usual well-known manner.

At or near each end of the platform A are arranged two upright supporting-pieces, D E, in suitable bearings in which pieces is arranged a rod or shaft, F, on which and with which the rake-heads G H, with their rakes I J, move. The rod or shaft F performs a triple duty—viz., it forms a support and way for the rake-heads to move on, it moves with the rake-heads during a portion of their movement, and finally turns upon its axis, forming, as it were, a hinge to swing the rake-heads out of and into their proper path, as will be hereinafter explained.

On the driving-wheel B is arranged a wrist-pin, $a$, to which one end of a pitman, $b$, is connected, the other end of said pitman being similarly attached to a crank or arm, $c$, on a rock-shaft, $d$, and on the rock-shaft $d$ is placed a segmental cog-wheel, K, which takes into and gives a reciprocating rotating motion to a pinion, L, on a shaft, $e$, supported in the horizontal arms M M. The shaft $e$ carries a pulley-wheel, N, which has a semi-rotating movement, and around this pulley N and another pulley-wheel, O, arranged at the opposite side of the platform, passes a cord, strap, or chain, P, the two ends of which are fastened to the rake-head H. The alternating motion of the strap or chain P, derived through the reciprocating motions of the several parts just above described, causes the rake-head H to traverse on the rod or bar F.

Behind the rake-head H is a cross-head, Q, permanently attached to the rod or bar F, and from this cross-head Q to the rake-head G extend two guide-rods, $ff$, upon which, as well as upon the bar F, the rake-head H traverses.

It will be seen that the rake J has to gather the gavel, as it only sweeps the whole width of the platform, and it is obvious that all the resistance on the fingers of said rake J must be communicated to the rake-head H with a degree equal to the length of leverage of the rake, and the rake-head would thus bind and run hard upon the shaft F and guide-rods $ff$. I propose to counteract such tendency by connecting to the rake-head H a rod, $g$, which passes through and slides in the cross-head Q, and then into and through a trumpet-shaped support, $h$, on the extreme end of the rod or bar F. This rod $g$, having a leverage equal if not greater than that of the rake J, will resist all binding of the rake-head H on its ways and allow it to run free and easy. As the rake J advances toward its fellow I the rod $g$ will draw out of the support $h$; but when this takes place the rake-head H will have moved so far from the cross-head Q that the cross-head itself becomes the support for said rod and still preserves the easy movement of the rake-head.

The trumpet form of the support $h$ is to admit of the ready entrance of the rod $g$ when it returns back to prepare for gathering the next gavel or clearance of the platform.

The rake-head G is a fixture on the shaft F and only moves with said shaft. It maintains its position (about as shown in the drawing) until its fellow J brings up the grain against it, and as the part J continues to move in that direction it carries the other part, I, with it, and also the shaft or rod F, because I and F are permanently connected together. The motion of the rake, with the gavel between them, continuing in that direction, the part I is brought against a projecting cam, R, which gives the rake, with its gathered gavel, and the rod F also, an outward or rolling motion in connection with its forward motion, and directs the rake to the point where the gathered gavel is to be dropped onto the ground. Underneath the cam R is another cam, S, which is pivoted at $i$ to the cam R, and the cam S is held against a stop, $k$, (dotted lines,) by a spring, $l$. When the rake, with its gavel, comes against the point $m$ of the cam S said cam moves back until the rake comes against the permanent cam R, which directs it to the place of delivery, and the cam R has a depression, $n$, (in dotted lines,) near its termination, into which the part I of the rake passes, and where it remains until the part J traverses back again to the opposite side of the platform, and it will be remembered that while it traverses back it is swung back by the rolling of the rod F, out of the way of the falling grain. While the part J is moving backward the other part, I, of the rake remains in the depression $n$ until the rake-head H comes up against the cross-head Q, when, by means of the rods $f$ and the permanency of said cross head on the rod F, the several parts move together to the end of their motion, and the rakes I J are ready to again sweep the platform and deliver another gavel.

On the rod F is an arm, $p$, which, as the rod F moves back for a second operation of the rake, comes against a cam-projection, T, which forces said rod and its rakes to come into proper position, should their own weight not be sufficient for this purpose. As the rakes move forward with the gavel between them their own weight pushes the cam S out of the way, and it has no effect upon the rake in going forward; but when the rake returns the part J moves back first and leaves the part I behind it, until, as before stated, H and Q are brought together, and then the part I follows, but not in the same path that it went forward in, for being relieved of its weight and its fellow J it comes back in the line of the throw of the cam S, it not having the power to force said cam aside. The object of this movement is to bring the part I into better position with regard to the falling grain on its return; and the cam S can be so shaped as to bring said part I to any special part of the platform without changing its direction or manner of leaving the platform with the gavel. In a word, the rake carries off the gavel by one cam and returns to its position by another cam.

Instead of the segment K and pinion L, I can use a bevel quadrant-wheel and bevel-pinion, and thus transmit the power from the main driver to the pulley in a more direct line, but this would be obvious to any mechanician.

It is immaterial in this raker what the size of the gavels may be, large or small, because the part I never starts until the part J presses the gathered grain or straw against it, and it is therefore a question of time merely, and not of quantity.

I propose, also, to make the quantity of straw that falls on the platform for the time being regulate the motion of the rake, so that the gavels shall be of uniform or nearly uniform size, regardless of thin or heavy standing grain, and this, too, to be automatic or self-regulating; but as this will constitute the subject-matter of another application for Letters Patent, I would merely state here that this will be done by the differential movement of the part I, for when the gavel is large the part I moves farther on the cam-plane $n$ than when the gavel is small, and I propose, by means of this difference, with a shipper and cone-pulleys and suitable ratchet, to make the rake run faster when the gavels are large and slower when small; but, as before stated, this invention will be separately applied for, and then fully explained.

Having thus fully described the nature of my invention, what I claim therein as new, and desire to secure by Letters Patent, is—

1. The combination of the rakes I J and rod F, when said parts are made to operate together and independently of each other, substantially as described.

2. In combination with the rakes and rod F, the permanent cam R and yielding cam S, which causes said rakes to advance in one line and return in another line, as set forth.

3. In combination with the rake-head H, the rod $g$, having its support alternately in Q and $h$, for the purpose of preventing said rake-head from binding on its ways, as set forth.

4. Giving the rake I a movement varying to the size of each and every gavel, as set forth.

JESSE WHITEHEAD.

Witnesses:
A. B. STOUGHTON,
THOS. H. UPPERMAN.